US008527902B2

(12) United States Patent
Vymenets

(10) Patent No.: US 8,527,902 B2
(45) Date of Patent: Sep. 3, 2013

(54) MULTIDIMENSIONAL VOLUME AND VIBRATION CONTROLS FOR A HANDHELD ELECTRONIC DEVICE

(75) Inventor: Leonid Vymenets, Mississuaga (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/601,582

(22) Filed: Aug. 31, 2012

(65) Prior Publication Data

US 2012/0319986 A1 Dec. 20, 2012

Related U.S. Application Data

(63) Continuation of application No. 12/354,476, filed on Jan. 15, 2009, now Pat. No. 8,286,095.

(51) Int. Cl.
*G06F 15/00* (2006.01)
*G06F 13/00* (2006.01)

(52) U.S. Cl.
USPC ........................................................ 715/833

(58) Field of Classification Search
USPC ................ 716/762–765, 851–853; 715/833, 715/810, 763–765, 751–753, 812, 345
See application file for complete search history.

(56) References Cited

U.S. PATENT DOCUMENTS

| 2006/0291666 | A1 | 12/2006 | Ball et al. |
| 2008/0122796 | A1 | 5/2008 | Jobs et al. |
| 2008/0174570 | A1* | 7/2008 | Jobs et al. ..................... 345/173 |

FOREIGN PATENT DOCUMENTS

EP 1600907 A1 11/2005

OTHER PUBLICATIONS

Office Action mailed Oct. 11, 2012, in corresponding Canadian patent application No. 2,689,409.
Extended European search report mailed Oct. 6, 2009, in corresponding European patent application No. 09150667.5.

* cited by examiner

*Primary Examiner* — Cao "Kevin" Nguyen
(74) *Attorney, Agent, or Firm* — Novak Druce Connolly Bove + Quigg LLP

(57) ABSTRACT

A system and method for adjusting a notification setting of a handheld electronic device is provided. The method includes receiving a request to adjust a notification setting which causes the electronic device to display a notification module on a display of the electronic device. The notification module includes a plurality of control portions each corresponding to a notification setting which can be adjusted within the corresponding control portion. The method further includes detecting a selection proximate to a control portion and inputting a notification setting change based upon a selection executed within one of the control portions. The notification setting is adjusted in response to the notification setting change.

20 Claims, 4 Drawing Sheets

MULTIDIMENSIONAL VOLUME AND VIBRATION CONTROLS FOR A HANDHELD ELECTRONIC DEVICE

CROSS REFERENCE TO RELATED APPLICATIONS

This application claims priority to U.S. patent application Ser. No. 12/354,476, filed on Jan. 15, 2009, now U.S. Pat. No. 8,286,095, and entitled "Multidimensional Volume and Vibration Controls for a Handheld Electronic Device," which is incorporated herein by reference.

FIELD OF TECHNOLOGY

The present application relates generally to handheld electronic devices having a graphical user interface to adjust notification settings of the device. More specifically, the present application relates to systems and methods for adjusting notification settings such as a volume setting, a vibration setting and a combination vibration and volume setting within a notification module displayed on a display of a handheld electronic device.

BACKGROUND

With the proliferation of more robust wireless communications systems, advancements of wireless handheld electronic communication devices are becoming more feasible. Handheld electronic communication devices can provide a variety of functions including, for example, telephonic, electronic messaging and other personal information manager (PIM) application functions. Handheld electronic communication devices include mobile stations such as simple cellular telephones, smart telephones, wireless PDAs, and laptop computers with wireless 802.11 or Bluetooth capabilities.

Graphical user interfaces (GUI) are common to handheld electronic communication devices such as cellular telephones, smart telephones and wireless PDAs. GUIs are useful for enabling direct user interaction with user-selectable target images on a display of a handheld electronic communication device. GUIs are also used to adjust notification settings of the handheld electronic communication device. Notification settings such as volume and vibration settings are important to the functionality of handheld electronic communication devices. Current GUIs comprise a plurality of separately displayed notification modules for adjusting notification settings (one for adjusting volume settings and one for adjusting vibration settings).

BRIEF DESCRIPTION OF THE DRAWINGS

Embodiments of the present application will now be described, by way of example only, with reference to the attached Figures, wherein.

DETAILED DESCRIPTION

Figure 1:
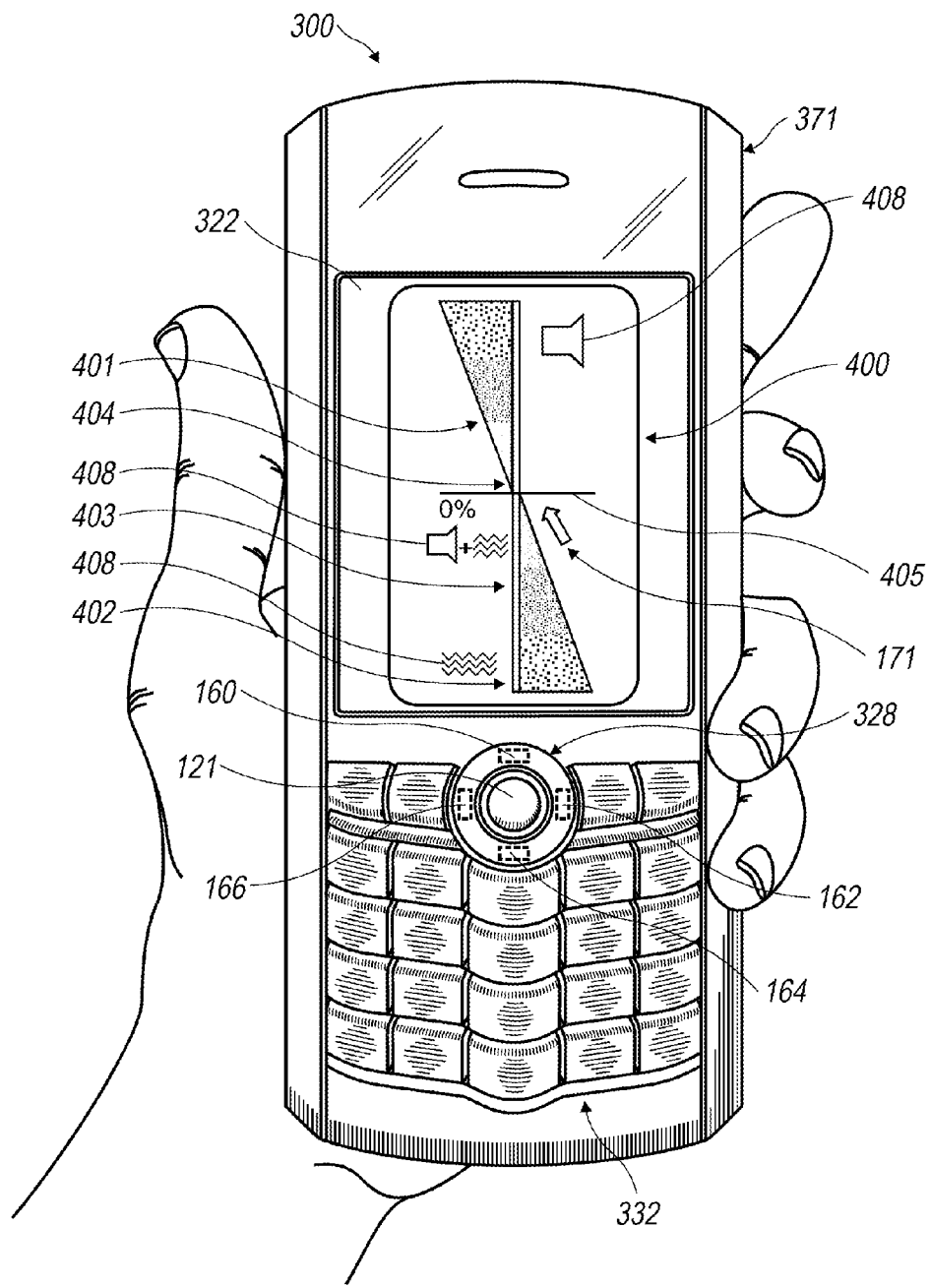
FIG. 1 illustrates an example electronic device having a navigational tool and displaying a notification module on the display of the device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein. Also, the description is not to be considered as limiting the scope of the embodiments described herein.

Figure 2:
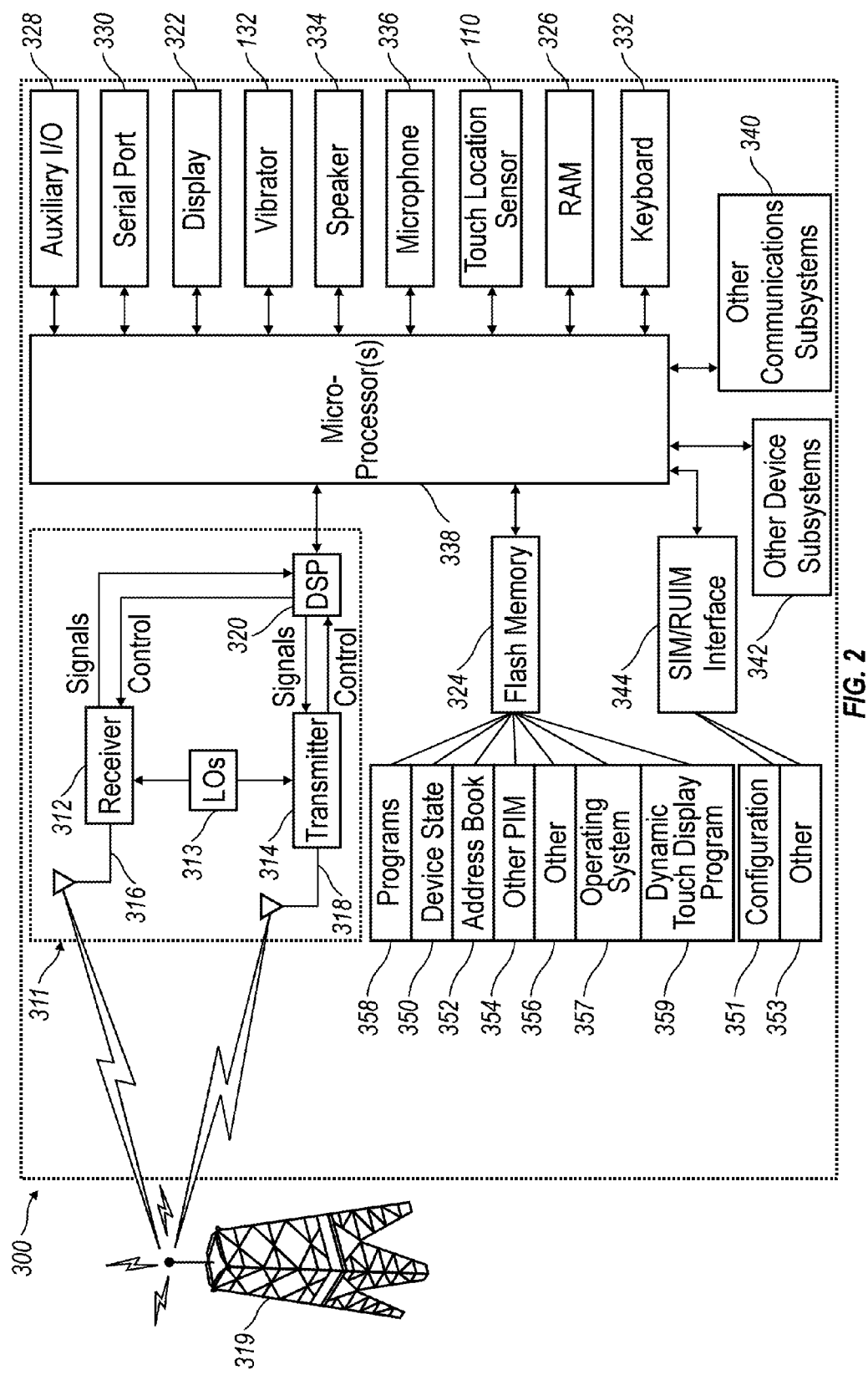
FIG. 2 is a block diagram representing an example electronic device interacting in a communication network.

An example electronic device 300 is shown in FIG. 1, and the device's cooperation in a wireless network 319 is exemplified in the block diagram of FIG. 2. The embodiment depicted in the figures are provided for example and illustration purposes only, and those persons skilled in the art will appreciate the additional elements and modifications necessary to make the electronic device 300 operable in particular network environments. While in the illustrated embodiment, the electronic device 300 includes a handheld communication device, in other embodiments, the electronic device 300 may comprise a handheld wireless communication device, a personal digital assistant (PDA), laptop computer, desktop computer, a server, or other communication device.

As shown in the block diagram of FIG. 2, the electronic device 300 includes a microprocessor 338 that controls the operation of the electronic device 300. A communication subsystem 311 performs all communication transmission and reception with the wireless network 319. The microprocessor 338 is connected to an auxiliary input/output (I/O) subsystem 328 which is connected to the device 300. Additionally, in at least one embodiment, the microprocessor 338 is connected to a serial port (for example, a Universal Serial Bus port) 330 that facilitates communication with other devices or systems via the serial port 330. A display 322 is connected to microprocessor 338 to display information to an operator of the device 300. When the electronic device 300 is equipped with a keyboard 332, which may be physical or virtual, the keyboard 332 is connected to the microprocessor 338. The electronic device 300 includes a speaker 334, a microphone 336, random access memory 326 (RAM), and flash memory 324, all of which may be connected to the microprocessor 338. Additionally, a vibrator 132 comprising a vibrator motor is connected to the microprocessor 338 to generate vibrations in the electronic device 300. The device 300 may include other similar components that are optionally connected to the microprocessor 338. Other communication subsystems 340 and other device subsystems 342 are generally indicated as being functionally connected to the microprocessor 338. An example of a communication subsystem 340 is a short range communication system such as BLUETOOTH® communication module or a WI-FI® communication module (a communication module in compliance with IEEE 802.11b). These subsystems 340 and their associated circuits and components can be functionally connected to the microprocessor 338. Additionally, the microprocessor 338 is able to perform operating system functions and enables execution of programs on the electronic device 300. In some embodiments the electronic device 300 does not include all of the above components. For example, in at least one embodiment the keyboard 332 is not provided as a separate component and is instead integrated with a touch-sensitive display 100 as described below.

Furthermore, the electronic device 300 is equipped with components to enable operation of various programs, as shown in FIG. 2. In an exemplary embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device program 358 or parts thereof may be loaded in RAM 326 or other volatile memory.

As shown in FIG. 2, a dynamic touch display program 359 is stored on Flash Memory 324. The dynamic touch display program 359 can control a computing device to provide a tactile key edge on a transparent cover lens of an electronic device. The program can cause the computer to display a keyboard comprising a plurality of adjacent key images on a display screen of the electronic device, wherein each key image comprises a central area bounded by a peripheral edge. Additionally, the computer program can cause the computer to receive location data from a touch location sensor indicative of at least one detected sweeping contact upon the transparent cover lens that traverses a peripheral edge of one of the plurality of key images. Furthermore, the dynamic touch display program 359 can vibrate the transparent cover lens in a tactile key-edge simulating modulation pattern when the lens contact location data is indicative of contact traversal across a key image peripheral edge. Other elements of the program will be explained in relation to the figures described below.

In one exemplary embodiment, the flash memory 324 contains programs 358 for execution on the electronic device 300 including an address book 352, a personal information manager (PIM) 354, and the device state 350. Furthermore, programs 358 and other information 356 including data can be segregated upon storage in the flash memory 324 of the electronic device 300.

When the electronic device 300 is enabled for two-way communication within the wireless communication network 319, it sends and receives signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 300 may require a unique identifier to enable the electronic device 300 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in a multitude of different electronic devices 300. The electronic device 300 can operate some features without a SIM/RUIM card, but a SIM/RUIM card is necessary for communication with the network 319. A SIM/RUIM interface 344 located within the electronic device 300 allows for removal or insertion of a SIM/RUIM card (not shown). The SIM/RUIM card features memory and holds key configurations 351, and other information 353 such as identification and subscriber related information. With a properly enabled electronic device 300, two-way communication between the electronic device 300 and communication network 319 is possible.

If the electronic device 300 is enabled as described above or the communication network 319 does not require such enablement, the two-way communication enabled electronic device 300 is able to both transmit and receive information from the communication network 319. The transfer of communication can be from the electronic device 300 or to the electronic device 300. In order to communicate with the communication network 319, the electronic device 300 in the presently described exemplary embodiment is equipped with an integral or internal antenna 318 for transmitting signals to the communication network 319. Likewise the electronic device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the electronic device 300.

When equipped for two-way communication, the electronic device 300 includes a communication subsystem 311. As is understood in the art, this communication subsystem 311 supports the operational needs of the electronic device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the electronic device 300 with the wireless network 319 is any type of communication that both the wireless network 319 and electronic device 300 are enabled to transmit, receive and process. In general, these can be classified as voice and data. Voice communication generally refers to communication in which signals for audible sounds are transmitted by the electronic device 300 through the communication network 319. Data generally refers to all other types of communication that the electronic device 300 is capable of performing within the constraints of the wireless network 319.

Example device programs that depend on such data include email, contacts and calendars. For these device programs, synchronization with home-based versions of the programs is desirable for either or both of their long term and short term utility. As an example, emails are often time sensitive, so substantially real time synchronization may be desired. Contacts, on the other hand, are usually updated less frequently without inconvenience. Therefore, the utility of the electronic device 300 is enhanced when connectable within a communication system, and when connectable on a wireless basis to a network 319 in which voice, text messaging, and other data transfer are accommodated.

While the above description generally describes the systems and components associated with a handheld electronic device, the electronic device 300 can be another communication device such as a PDA, a laptop computer, desktop computer, a server, or other communication device. In those embodiments, different components of the above system might be omitted in order provide the desired electronic device 300. Additionally, other components not described above may be required to allow the electronic device 300 to function in a desired fashion. The above description provides only general components and additional components may be required to enable system functionality. These systems and components would be appreciated by those of ordinary skill in the art.

Auxiliary I/O subsystem 328 comes in a variety of different forms including a navigational tool 328. Navigational tools include rotatable thumb wheels, joysticks, touchpads, four-way cursors, trackball based devices and the like. The preferred embodiment of the navigational tool 328 is a trackball based device. Other auxiliary I/O subsystems capable of providing input or receiving output from the handheld electronic device 300 such as external display devices and externally connected keyboards (not shown) are considered within the scope of this disclosure.

An exemplary handheld electronic device 300 is depicted in FIG. 1. The device 300 includes a body 371 housing a lighted display 322, a navigational tool (auxiliary input) 328 and a keyboard 332 suitable for accommodating textual input. The device 300 of FIG. 1 is of unibody construction, but common "clamshell" or "flip-phone" constructions are also suitable for the embodiments disclosed herein. The display 322 is located above the keyboard 332. The navigational tool (auxiliary input) 328 is located essentially between the display 322 and the keyboard 332. The keyboard 332 comprises a plurality of keys with which alphabetic letters are associated, but at least a portion of the individual keys have multiple letters associated therewith. This type of configuration is referred to as a reduced keyboard (in comparison to the full keyboard described immediately above) and can, among others come in QWERTY, QWERTZ, AZERTY, and Dvorak layouts.

In one embodiment shown in FIG. 1, the auxiliary input is a trackball navigational tool 328. The trackball 121 of the trackball navigational tool 328 is exposed for user manipulation at an exterior face of the device 300 and is freely rotatable. Motion of the trackball 121 is assessed using a plurality of sensors 160, 162, 164, 166 that are positioned adjacent the trackball navigation tool 328 and determine increments of rotation of the trackball 121 about a particular axis of rotation. In a preferred embodiment, the sensors 160, 162, 164, 166 quantify rotational motion of the trackball 121 about an x-axis and an intersecting y-axis of the trackball 121. The sensors 160, 162, 164, 166 require power to be supplied to detect motion of the trackball 121. These sensors 160, 162, 164, 166 further output a cursor control signal based upon the sensed motion of the trackball 121. Furthermore, the trackball navigational tool 328 utilizes a sensor (not shown) to detect depression of the trackball 121.

In accordance with FIG. 1, a handheld electronic device 300 is shown that includes a lighted display 322 on which a cursor 171 is displayed for moving in correspondence with detected rotational movement of a trackball 121 in a trackball navigational tool 328 of the device 300. A control program is employed that permits designation of an amount of movement of the cursor 171 to be induced on the display 322 relative to an amount of detected rotational movement of the trackball 121. Control programs of similar type are routinely employed and well known in the art, and therefore specifics of the implementation are not described in further detail in the present disclosure.

In one embodiment, the control program can be employed to affect diagonal movement of the cursor 171 on the display 322. Sensors 160, 162 (164, 166) are provided that are capable of sensing movement of the trackball 121 indicative of the user's desire to affect diagonal movement of the cursor 171. The sensors produce x-direction signals and y-direction signals based on the sensed movement of the trackball 121. Based on cursor control signals output by the sensors 160, 162, 164, 166, a processor 338 employs the control program to quantify x-direction magnitude and y-direction magnitude of the trackball 121 to designate corresponding movement of the cursor 171 on the display 322.

In accordance with the embodiment of FIG. 1, a method for adjusting notification settings of a handheld electronic device 300 is provided. The method includes receiving a request to adjust a notification setting which causes the electronic device 300 to display a notification module 400 on the display 322. A request may include selecting a notification setting icon in a drop down menu displayed on the display 322, actuating a key on the body 371 of the electronic device 300, executing a voice command or any other input that causes the device 300 to display the notification module 400. The notification module 400 can include a variety of different notification settings each with a corresponding control portion of the notification module 400 within which the notification setting is adjusted. In one embodiment, the notification module 400 includes a volume control portion 401, a vibrate control portion 402, a combination vibrate and volume control portion 403 and an off control portion 404. The control portions 401, 402, 403, 404 are serially located on the touch-sensitive display 100, such that the control portions 401, 402, 403, 404 are located in relation to one another in a pattern. As illustrated, the control portions 401, 402, 403, 404 can be contiguously located on the display 322, such that at least one boundary of each respective control portions 401, 402, 403, 404 is located adjacent to at least one boundary of another of the respective control portions 401, 402, 403, 404. In the illustrated embodiment, the control portions 401, 402, 403, 404 are located substantially linearly, one above the others, on the display 322. While in the illustrated embodiment, the control portions 401, 402, 403, 404 are arranged linearly, in other embodiments the control portions 401, 402, 403, 404 can be arranged in another pattern such as circular, rectangular, angular, and curvilinear, among others. A graphical object 408 within each control portion 401, 402, 403, 404 of the notification module 400 is displayed to distinguish an area or portion of the notification module 400 in which a corresponding notification setting can be adjusted. The notification settings include a volume setting corresponding to the volume control portion 401, a vibrate setting corresponding to the vibrate control portion 402, a combination vibrate and volume setting corresponding to the combination vibrate and volume control portion 403 and an off setting corresponding to the off control portion 404.

The method further includes detecting a selection proximate to any one of the control portions 401, 402, 403, 404 of the notification module 400. In accordance with the embodiment shown in FIG. 1, the selection can be performed with a trackball 121. For example, the notification module 400 further includes a cursor 171 displayed for moving in correspondence with detected rotational movement of a trackball 121 in the navigational tool 328. A user inputs a notification setting change by executing a selection with the trackball navigational tool 328. In one embodiment, a selection is executed by depressing the trackball 121 after positioning the cursor 171 proximate a movable slider 405 within one of the control portions 401, 402, 403, 404. While a cursor 171 is illustrated in FIG. 1, in at least one embodiment the cursor can be omitted and the rotational motion of the trackball results in movement of movable slider 405 directly. The movable slider 405 indicates the selection within the notification module.

In another embodiment, the slider 405 can be dragged along a linear path by depressing the trackball 121 proximate the slider 405 and rotating the trackball 121 until the slider 405 is in a desired coordinate position within one of the control portions 401, 402, 403, 404. The selection is executed by releasing depression of the trackball 121 once the slider 405 is in the desired coordinate position.

A notification setting change is input based upon the selection executed by the selection tool 328. The notification setting is adjusted in response to the notification setting change. The volume setting is adjusted if the selection is executed in the corresponding volume control portion 401, the vibrate setting is adjusted if the selection is executed in the corresponding vibrate control portion 402 and a combination vibrate and volume setting (which simultaneously controls both vibrate and volume intensities) is adjusted if the selection is executed in the corresponding combination vibrate and volume control portion 403. Volume and vibrate functionalities are turned off when the slider 405 is positioned in the off control portion 404 of the notification module 400.

Figure 3:
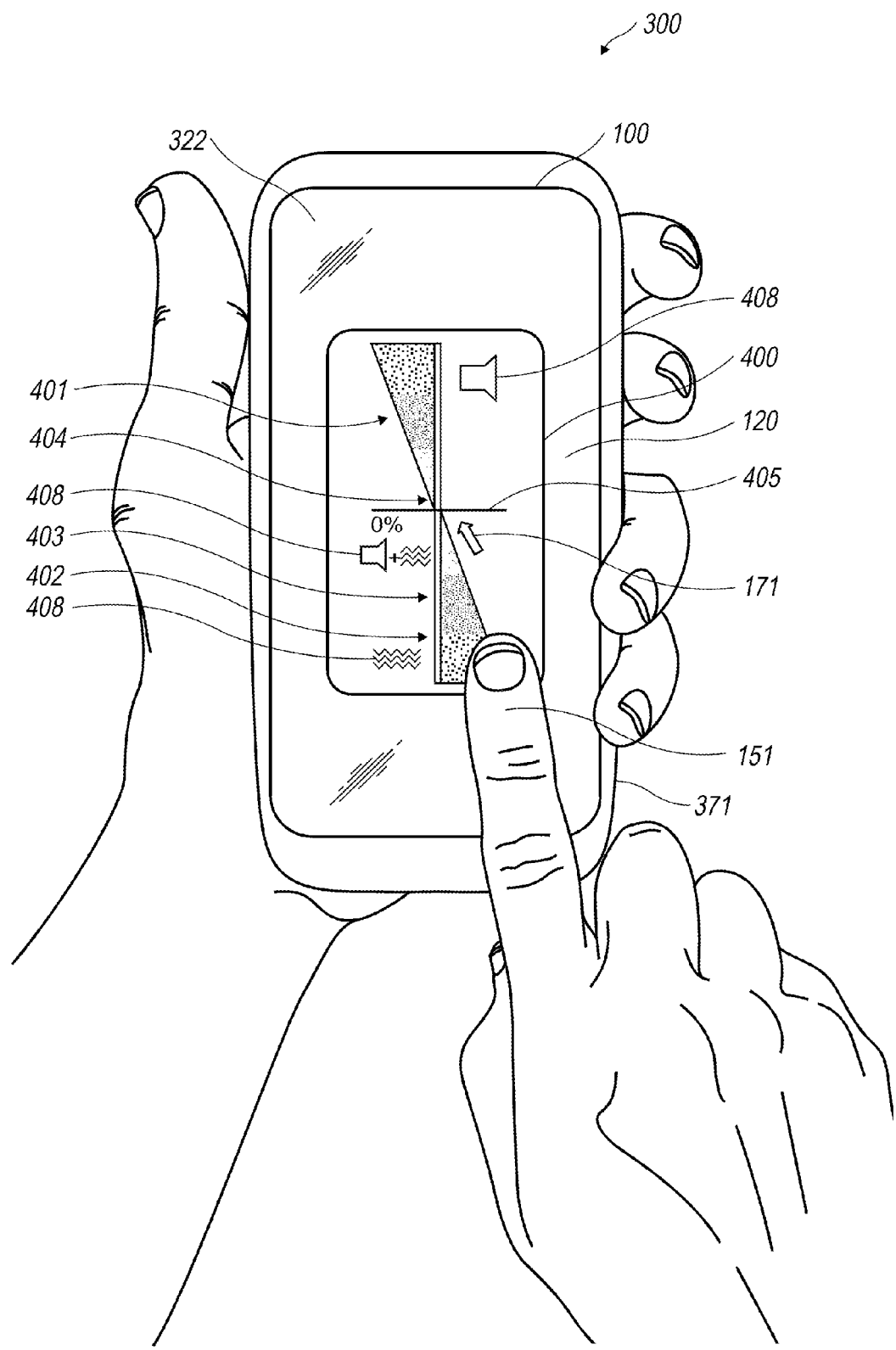
FIG. 3 illustrates an example electronic device having a touch-sensitive display and displaying a notification module on the display of the device.

In another embodiment shown in FIG. 3, the body 371 of the electronic device 300 houses a touch-sensitive display 100 comprising a display 322, touch location sensor 110 (illustrated in FIG. 4) and a transparent cover lens 120. The touch-sensitive display 100 is illustrated and described in detail in connection with FIG. 4. Additionally, other keys may be placed along the side of body 371 of the electronic device 300 to function as escape keys, volume control keys, scrolling keys, power switches, or user programmable keys, and may likewise be programmed accordingly. In another embodiment, the touch-sensitive display 100 may be integrated with a keyboard 332 having depressible keys. In such an embodiment, the touch-sensitive display 100 provides navigational control and the keyboard 332 provides text entry control.

Figures 4, 5:
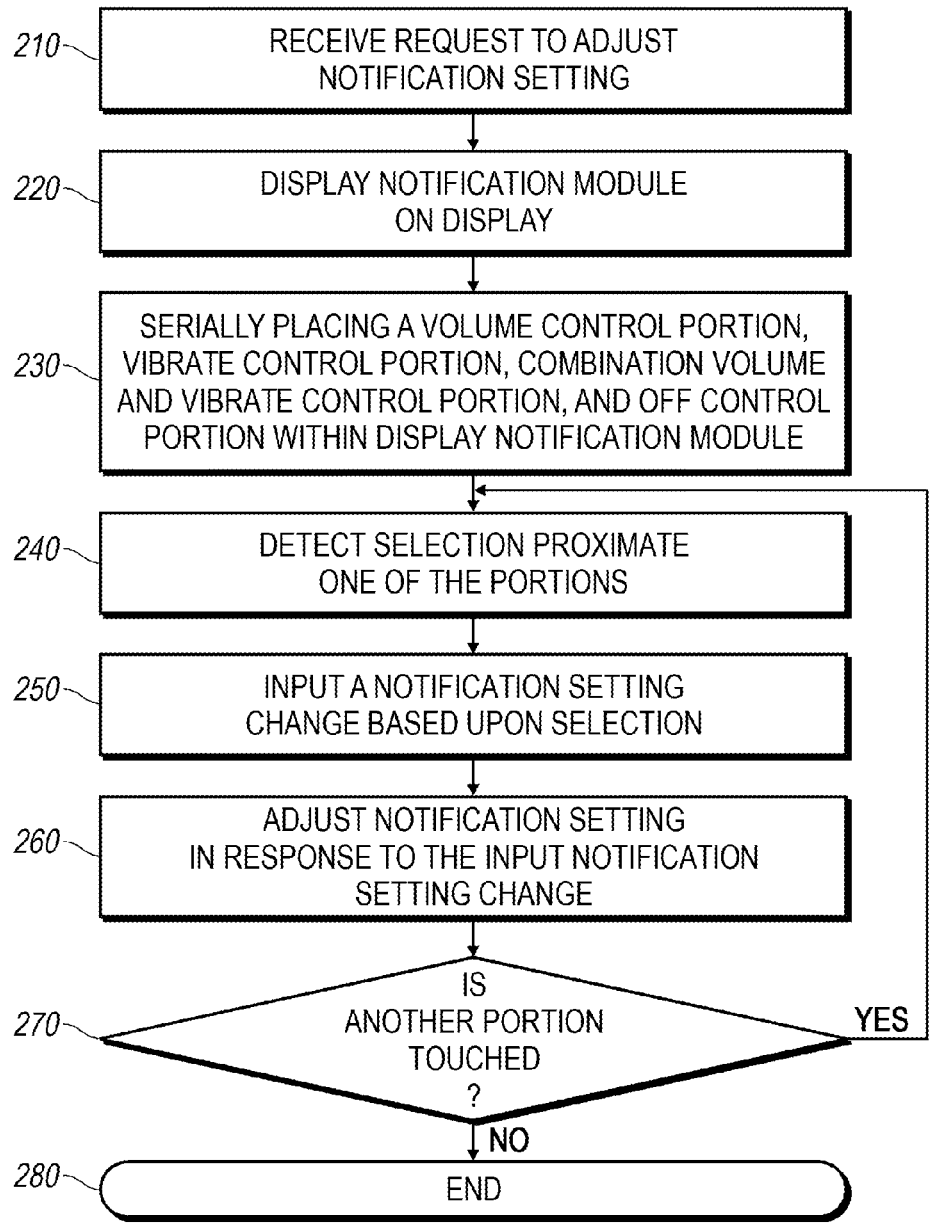
FIG. 4 illustrates an example of touch-sensitive display.
FIG. 5 illustrates an example of a method according to the present disclosure.

The touch-sensitive display 100, as illustrated in FIG. 4 comprises a display 322, touch location sensor 110 and a transparent cover lens 120. In at least one embodiment, the touch location sensor 110 is provided on a portion of the display 322. In other embodiments, the touch location sensor 110 is a separate component that is provided as part of the touch-sensitive display 100. As illustrated, the touch location sensor 110 is shown as located above the display 322, but in other embodiments the touch location sensor 110 is located below the display 322. The touch location sensor 110 can be a capacitive, resistive or other touch sensitive sensor. The display 322 can be a liquid crystal display (LCD) or a light emitting diode (LED) display. It is also contemplated within this disclosure that the display 322 can be another type of device which is capable of visually displaying information.

In accordance with the embodiment of FIG. 3, a method for adjusting notification settings of a handheld electronic device 300 is provided. The method includes receiving a request to adjust a notification setting which causes the electronic device 300 to display a notification module 400 on the display 322. A request may include selecting a notification setting icon in a drop down menu displayed on the display 322, actuating a key on the body 371 of the electronic device 300, actuating a user-selectable target image by depressibly engaging the touch-sensitive display 100, executing a voice command or any other input that causes the device 300 to display the notification module 400. The notification module 400 can include a variety of different notification settings each with a corresponding control portion of the notification module 400 within which the notification setting is adjusted. In one embodiment, the notification module 400 includes a volume control portion 401, a vibrate control portion 402, a combination vibrate and volume control portion 403 and an off control portion 404. The control portions 401, 402, 403, 404 are serially located on the touch-sensitive display 100. Additionally, the control portions 401, 402, 403, 404 can be contiguously located on the display 322, such that at least one boundary of each respective control portions 401, 402, 403, 404 is located adjacent to at least one boundary of another of the respective control portions 401, 402, 403, 404. In the illustrated embodiment, the control portions 401, 402, 403, 404 are located substantially linearly, one above the others, on the display 322. A graphical object 408 within each control portion 401, 402, 403, 404 of the notification module 400 is displayed to distinguish in area or portion of the notification module 400 in which a corresponding notification setting can be adjusted. The notification settings include a volume setting corresponding to the volume control portion 401, a vibrate setting corresponding to the vibrate control portion 402, a combination vibrate and volume setting corresponding to the combination vibrate and volume control portion 403 and an off setting corresponding to the off control portion 404.

The method further includes detecting a selection proximate to any one of the control portions 401, 402, 403, 404 of the notification module 400. In the illustrated embodiment, the selection can be executed with use of a selection tool 151 that is placed proximate to the touch-sensitive display screen 100 and the corresponding control portion. In accordance with the embodiment shown in FIG. 3, the selection tool 151 can be a finger, but a variety of different selection tools 151 are considered within the scope of this disclosure including a finger of a user, a conductive stylus, a pen, a writing instrument, and the like. The notification module 400 includes a cursor 171 displayed for moving in correspondence with the movement of the selection tool 151 in relation to the touch-sensitive display 100. While in some example embodiments the selection tool 151 may contact a surface of the touch-sensitive display 100, the disclosure contemplates detecting movement of the selection tool 151 without contacting a surface of the touch-sensitive display 100.

A user inputs a notification setting change by executing a selection with the selection tool 151. In one embodiment, a selection is executed by depressibly engaging the touch-sensitive display 100 with the selection tool 151 proximate a movable slider 405 within one of the volume control portion 401, the vibrate control portion 402, the combination vibrate and volume control portion 403 and the off control portion 404 of the notification module 400.

In another embodiment, the slider 405 can be dragged along a linear path by depressibly engaging the touch-sensitive display 100 proximate the slider 405 with the selection tool 151 and moving the selection tool 151 until the slider 405 is in a desired coordinate position within one of the control portions 401, 402, 403, 404 of the notification module 400. The selection is executed by removing the selection tool 151 from the touch-sensitive display 100 once the slider 405 is in the desired coordinate position.

A notification setting change is input based upon the selection executed by the selection tool 151. The notification setting is adjusted in response to the notification setting change. The volume setting is adjusted if the selection is executed in the corresponding volume control portion 401, the vibrate setting is adjusted if the selection is executed in the corresponding vibrate control portion 402 and a combination vibrate and volume setting (which simultaneously controls both vibrate and volume intensities) is adjusted if the selection is executed in the corresponding combination vibrate and volume control portion 403. Volume and vibrate settings are turned off when the slider 405 is positioned in the off control portion 404 of the notification module 400.

In an alternative embodiment, the notification module includes a plurality of movable sliders 405 (not shown) each designated to a control portion 401, 402, 403, 404 of the notification module 400. A notification setting is adjusted after a selection is executed by positioning a designated slider 405 in the desired coordinate position within a corresponding control portion 401, 402, 403, 404 of the notification module 400.

In accordance with embodiments shown in FIG. 1 and FIG. 3, the notification module 400 can further include a displayed magnitude of notification setting intensity corresponding to the coordinate position of the slider 405 within one of the control portions 401, 402, 403, 404 of the notification module 400. The displayed magnitude of notification setting intensity can be a number from 1 to 10, a percentage from 1 to 100 percent, or any other graphical depiction appreciated by one of ordinary skill in the art as indicating a magnitude of setting intensity.

In another embodiment, the notification module 400 can further include a displayed color of notification setting intensity 407 corresponding to the coordinate position of the slider 405 within one of the control portions 401, 402, 403, 404 of the notification module 400. The displayed color of notification setting intensity may be a light shade for low setting intensities and a dark shade for high setting intensities. As would be appreciated by one of ordinary skill in the art, any number of colors or combinations thereof can be used to indicate a setting intensity.

An examplary method is illustrated in FIG. 5. The method includes receiving a request to adjust a notification setting (block 210). The method further displays a notification module on the display (block 220). The notification module involves serially placing a volume control portion, vibrate control portion, a combination volume and vibrate control portion, and off control portion within the displayed notification module, such that the volume control portion, vibrate control portion, a combination volume and vibrate control portion, and off control portion are located in relation to one another in a pattern (block 230). The method further detects a selection proximate one of the portions (block 240). Additionally, the method includes inputting a notification setting change based upon the executed selection (block 250). Furthermore, an adjustment to the notification setting is made in response to the input notification setting change (block 260). In at least one embodiment, a determination is made whether another portion is touched (block 270). If it is determined that another portion is touched then the method continues at previous block 240 until no additional portion is touched at which point the method ends (block 280) and the notification setting is changed. In other embodiments, the notification change can be immediately affected and any additional change requires requesting an additional notification setting change.

As described herein, one example embodiment is an electronic device 300 including a body 371 housing a lighted display 322, a navigational tool (auxiliary input) 328 and a keyboard 332 suitable for accommodating textual input. The display 322 is located above the keyboard 332. The navigational tool (auxiliary input) 328 is located essentially between the display 322 and the keyboard 332. Additionally, a microprocessor 338 is included and is in data-communication with the display 322. The microprocessor 338 is capable of running software programmed to display a notification module 400 including a volume control portion 401, a vibrate control portion 402, a combination vibrate and volume control portion 403 and an off control portion 404 on the display 322. The software receives a request to adjust a notification setting and detects a selection proximate to one of the volume control portion 401, the vibrate control portion 402, the combination vibrate and volume control portion 403 and the off control portion 404. Additionally, the software inputs a notification setting change based upon the selection executed by the selection tool 328 within one of the volume control portion 401, the vibrate control portion 402, the combination vibrate and volume control portion 403 and the off control portion 404. Furthermore, the software adjusts a notification setting in response to the notification setting change. In other embodiments, features as described above may also be incorporated into the electronic device 300.

As described herein, another example embodiment is an electronic device 300 including a touch-sensitive display 100. The electronic device 300 includes a body 371 housing a touch-sensitive display 100 comprising a display 322, a touch location sensor 110, and a transparent cover lens 120. The electronic device 300 also includes a switch 140 coupled to the cover lens 120. Additionally, a microprocessor 338 is included and is in data-communication with the display 322 and the touch location sensor 110. The microprocessor 338 is capable of running software programmed to display a notification module 400 including a volume control portion 401, a vibrate control portion 402, a combination vibrate and volume control portion 403 and an off control portion 404 on the display 322. The software receives a request to adjust a notification setting and detects a selection proximate to one of the volume control portion 401, the vibrate control portion 402, the combination vibrate and volume control portion 403 and the off control portion 404. Additionally, the software inputs a notification setting change based upon the selection executed by the selection tool 151 within one of the volume control portion 401, the vibrate control portion 402, the combination vibrate and volume control portion 403 and the off control portion 404. Furthermore, the software adjusts a notification setting in response to the notification setting change. In other embodiments, features as described above may also be incorporated into the electronic device 300.

In yet another example embodiment, a computer-readable medium having a computer program for adjusting a notification setting of the notification module displayed on a display 322 is provided. The computer program receives a request to adjust a notification setting which causes a computer to display a notification module including a volume control portion 401, a vibrate control portion 402, a combination vibrate and volume control portion 403 and an off control portion 404 on the display 322. The computer program causes the computer to detect a selection proximate to one of the volume control portion 401, the vibrate control portion 402, the combination vibrate and volume control portion 403 and the off control portion 404 of the notification module 400. Furthermore, the computer program causes the computer to input a notification setting change based upon the selection executed by the selection tool 328 within one of the volume control portion 401, the vibrate control portion 402, the combination vibrate and volume control portion 403 and the off control portion 404. The computer program causes the computer to adjust a notification setting in response to the notification setting change. Additionally, the computer-readable medium can employ the features as described above.

Example embodiments have been described hereinabove regarding the implementation of a method and system for adjusting notification settings within a notification module 400 on network operable electronic devices 300. Various modifications to and departures from the disclosed example embodiments will occur to those having skill in the art. The subject matter that is intended to be within the spirit of this disclosure is set forth in the following claims.

What is claimed is:

1. A method for adjusting control settings of a communication device comprising:
   rendering a control module on a display of the communication device;
   rendering a plurality of control portions within the control module, the control portions being serially and contiguously located on the display, the plurality of control portions comprising:
      a first control portion corresponding to a first feature;
      a second control portion corresponding to a second feature;
      a third control portion corresponding to a combination of the first and second features; and
      a fourth control portion corresponding to disabling the first and second features;
   rendering the third control portion and the fourth control portion in a location between the first control portion and the second control portion; and
   obtaining at the control module a different, non-overlapping portion of a single defined range of input values; and
   allocating the single defined range to each of the first control portion, the second control portion, the third control portion, and the fourth control portion.

2. The method as recited in claim 1, wherein the plurality of control portions are located substantially linearly, one above the others, on the display.

3. The method as recited in claim 2, wherein the control setting includes one of a volume setting corresponding to the first control portion, a vibrate setting corresponding to the second control portion, a combination vibrate-and-volume setting corresponding to the third control portion and a disablement setting corresponding to the fourth control portion.

4. The method as recited in claim 2, wherein the control module further includes a movable slider having a slider coordinate position controlled by a selection tool.

5. The method as recited in claim 4, further comprising:
   detecting a selection proximate to one of the plurality of control portions wherein detecting further includes detecting the selection proximate the movable slider within one of the control portions;
   generating a change request based upon the detected selection within one of the plurality of control portions; and
   adjusting the control setting in response to the change request.

6. The method as recited in claim 4, wherein the control module further includes a displayed color of setting intensity corresponding to the slider coordinate position within one of the control portions.

7. The method as recited in claim 4, wherein the control module further includes a displayed magnitude of setting intensity corresponding to the slider coordinate position within one of the control portions.

8. The method as recited in claim 4, wherein the display is a touch-sensitive display and wherein detecting a selection further includes detecting depressible engagement of the touch-sensitive display by a selection tool proximate the movable slider within one of the control portions.

9. The method as recited in claim 8, wherein the control module further includes a visible cursor that moves in correspondence with the movement of the selection tool in relation to the touch-sensitive display.

10. The method as recited in claim 9, wherein the selection is executed by the selection tool including a stylus.

11. The method as recited in claim 3, wherein the control module further includes a plurality of moveable sliders with each moveable slider having a slider coordinate position controlled by the selection tool and each moveable slider is associated with a corresponding one of the control portions.

12. The method as recited in claim 11, wherein detecting further includes detecting the selection proximate one of the movable sliders within one of the control portions.

13. The method as recited in claim 11, wherein the display is a touch-sensitive display and wherein detecting a selection further includes detecting depressible engagement of the touch-sensitive display by a selection tool proximate one of the movable sliders within one of the control portions.

14. The method as recited in claim 13, wherein the control module further includes a visible cursor that moves in correspondence with the movement of the selection tool in relation to the touch-sensitive display.

15. The method as recited in claim 14, wherein the selection is executed by the selection tool including a stylus.

16. The method as recited in claim 14, wherein the selection is executed by the selection tool which is a navigational tool on the communication device.

17. A communication device comprising:
   a display;
   a processor in data-communication with the display of the communication device, the processor configured to render a control module on the display, the control module including a plurality of control portions within the control module, the control portions being serially and contiguously located on the display, the control portions comprising:
      a first control portion corresponding to a first feature;
      a second control portion corresponding to a second feature;
      a third control portion corresponding to a combination of the first and second features; and
      a fourth control portion corresponding to disabling the first and second features;
   the processor further being configured to:
      render the third control portion and the fourth control portion in a location between the first control portion and the second control portion; and
      obtain, at the control module, a different, non-overlapping portion of a single defined range of input values; and
      allocate the single defined range to each of the first control portion, the second control portion, the third control portion, and the fourth control portion.

18. The communication device as recited in claim 17, wherein the control setting includes one of a volume setting corresponding to the first control portion, a vibrate setting corresponding to the second control portion, a combination vibrate-and-volume setting corresponding to the third control portion and a disablement setting corresponding to the fourth control portion.

19. A non-transitory computer-readable storage medium having a program for adjusting a control setting of a communication device, the program causing the communication device to:
  render a control module on a display of the communication device;
  render a plurality of control portions within the control module, the control portions being serially and contiguously located on the display, the control portions comprising:
    a first control portion corresponding to a first feature;
    a second control portion corresponding to a second feature;
    a third control portion corresponding to a combination of the first and second features; and
    a fourth control portion corresponding to disabling the first and second features;
  render the third control portion and the fourth control portion in a location between the first control portion and the second control portion;
  obtain at the control module a different, non-overlapping portion of a single defined range of input values; and
  allocate the single defined range to each of the first control portion, the second control portion, the third control portion, and the fourth control portion.

20. The non-transitory computer-readable storage medium as recited in claim 19, wherein the control setting includes one of a volume setting corresponding to the first control portion, a vibrate setting corresponding to the second control portion, a combination vibrate-and-volume setting corresponding to the third control portion and a disablement setting corresponding to the fourth control portion.

* * * * *